Aug. 23, 1955    R. C. CLEVELAND    2,716,023
GLASS BLENDER
Filed March 23, 1953
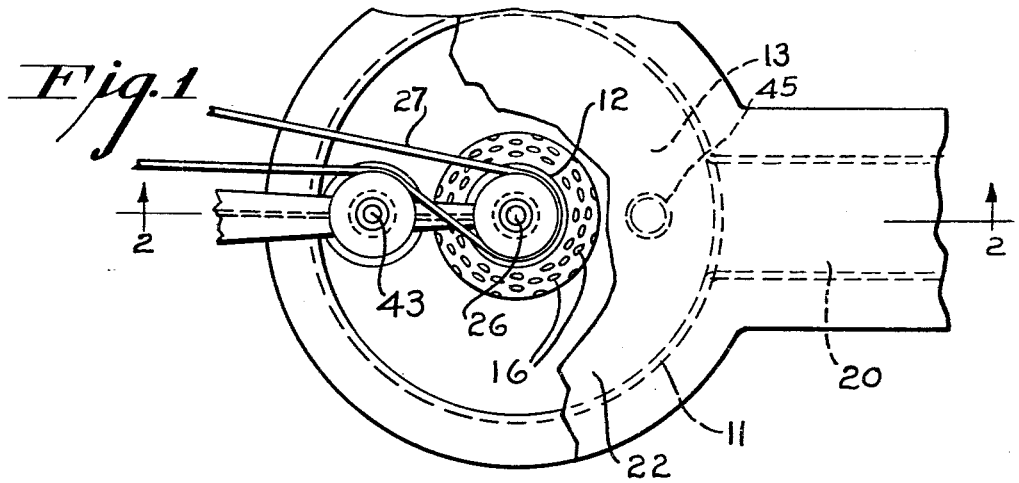
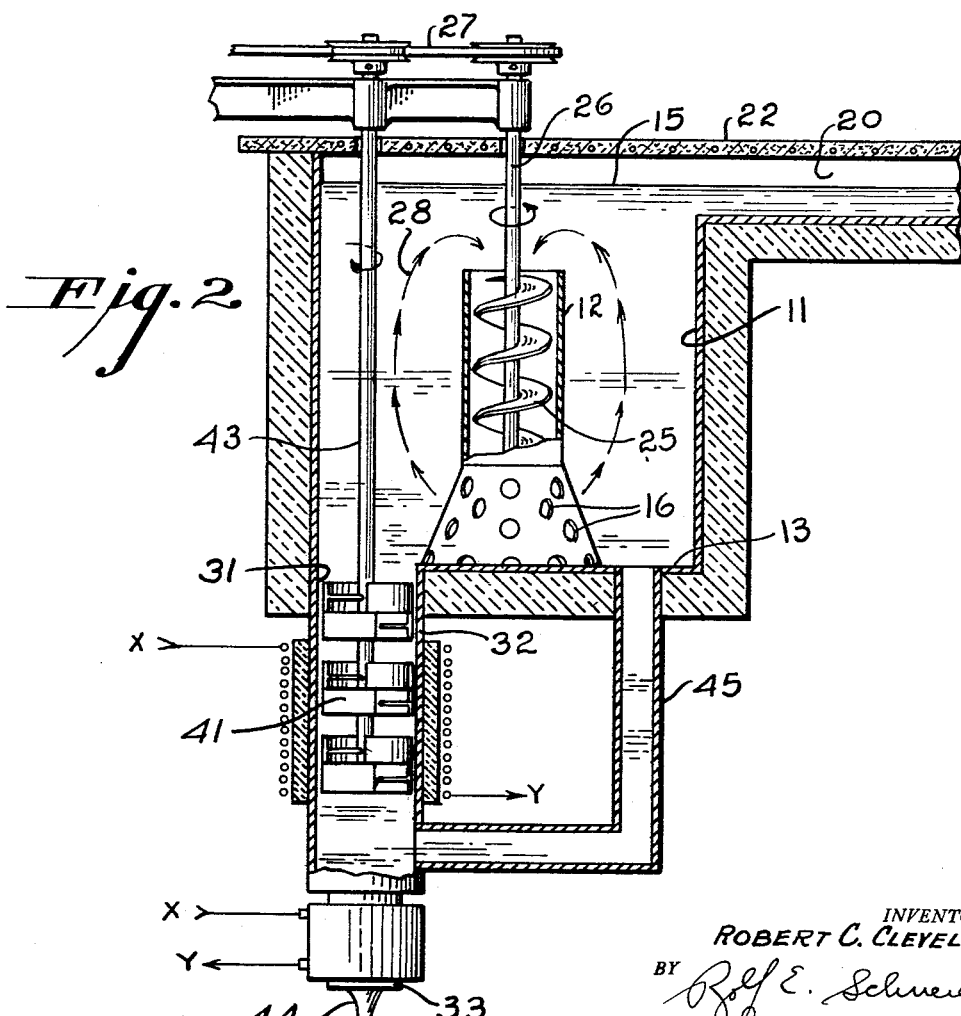
INVENTOR.
ROBERT C. CLEVELAND
BY Rolf E. Schneider
ATTORNEY.

United States Patent Office 2,716,023
Patented Aug. 23, 1955

2,716,023

GLASS BLENDER

Robert C. Cleveland, Corning, N. Y., assignor to Corning Glass Works, Corning, N. Y., a corporation of New York Application March 23, 1953, Serial No. 343,833

6 Claims. (Cl. 259—6)

The present invention relates to the conditioning of glass for the production of relatively large or massive glass objects which are not only substantially cord-free but whose individual index of refraction varies throughout within a very narrow range and is particularly directed to the production of such high-quality glass objects on a continuous basis.

In the continuous melting of glass, as will be appreciated, the glass stream flowing through the forehearth or other feeding arrangement from the batch-melting tank or other container varies in refractive index both longitudinally (i. e. with time) and transversely (i. e., cross section-wise at any given time). Longitudinal variations generally result from changes in the batch and in the melting conditions; transverse variations generally result from volatilization of molten glass constituents and from corrosion or erosion of the melting-container refractories and evidence themselves in the form of cords or striae.

The presence of such variations is of no particular significance in the production of most types of glassware. When glass designed for ophthalmic and optical purposes is being melted, however, the presence of such variations assumes primary importance since the quality and, hence, the saleability of the resulting ware are controlled thereby; and the reduction or substantial elimination of such variations becomes not only desirable but essential if satisfactory ware, i. e., ware in which the degree of homogeneity or variation of refractive index within an individual piece is maintained within a desired degree of tolerance, is to be produced.

By careful control of the batch composition together with maintenance of the melting conditions substantially constant, longitudinal variation of the refractive index can be held within a relatively narrow tolerance and, in some instances, has been held so that it is no greater than $\pm 2 \times 10^{-4}$. Through use of the homogenizing or stirring procedure described in Patent No. 2,569,459 issued to Charles F. De Voe on October 2, 1951, cords or striae present in the glass can be substantially completely eliminated.

Such controlled melting in combination with such stirring procedure has proved highly successful in the continuous pressing of ophthalmic lens blanks, precision optical parts, and the like. This combination has also been used with a reasonable degree of satisfaction in the casting of somewhat larger pieces of glass especially when the casting step itself is carried out in the manner described in Patent No. 2,534,415 issued to William H. Said and myself on December 19, 1950, which points out that, to avoid striae due to lapping or folding, the stream of glass being cast should be intercepted sufficiently close to its source so that spiralling thereof is prevented.

Where large masses of glass having an individual degree of homogeneity or overall refractive index variation within even closer tolerances and especially within $\pm 5 \times 10^{-5}$, are desired, however, such stirring procedure has not proved sufficient even though the melting operation is controlled to the extent indicated above. Such large glass masses find use in the manufacture of aerial camera lenses, wind-tunnel windows, and the like and may weigh from twenty to more than a hundred pounds each and require an individual overall refractive index variation no greater than $\pm 3 \times 10^{-5}$ or less.

As can readily be determined, the stirrer, which is conveniently operated in a vertical position, accomplishes primarily horizontal or transverse homogenization of the cords in the glass passing therethrough. While some overall blending of such glass may also occur, the extent of the same is very limited in any event so that the longitudinal refractive index variation of the glass remains substantially unchanged.

So long as the mass or volume of the desired glass piece, such as an ophthalmic lens blank, remains quite small compared to that of the stirring device, such longitudinal variation will not show up in the individual pieces of glass to an appreciable extent; and it may be possible to obtain a blank with an overall refractive index variation of less than $\pm 5 \times 10^{-5}$. As the volume of the glass piece is increased, however, such longitudinal variation becomes increasingly evident; and it is not possible to obtain castings approaching or exceeding the stirring device in volume and having an individual variation of refractive index less than that of the molten glass stream fed from the melting container to the stirrer.

It would seem at first glance that this difficulty could be readily resolved by increasing the size of the stirrer to maintain the same volume relationship between the stirrer and the glass piece as obtains in the pressing of ophthalmic lens blanks. To do so, however, would be not only mechanically impracticable particularly with regard to the size of the stirrer that would be required but also economically unfeasible.

As disclosed in the pending application of Charles F. De Voe, S. N. 344,133, filed concurrently herewith, the production of large or massive glass castings exceeding the stirrer in volume and having an individual refractive index variation materially less than the longitudinal refractive index variation of the continuously melted stream of glass can be accomplished by introducing and blending the continuously melted stream of glass into a body of previously melted glass of sufficient size and under such conditions that substantially greater uniformity of refractive index is imparted to the molten glass body as a whole prior to its passage through the stirrer. As described in such application, such blending is effected by maintaining a body of molten glass advantageously exceeding the desired casting in volume, continuously introducing the stream of glass into such body, and subjecting such body of molten glass and the continuously melted stream of glass introduced thereinto to repeated rapid circulation.

In accordance with the present invention, I have provided an arrangement whereby such blending and stirring can be most effectively accomplished. Such arrangement comprises effecting a vertical and preferably downward flow of glass in a confined zone centrally of the blender at a rate materially greater than that at which the stream of continuously melted glass is introduced thereinto advantageously while simultaneously imparting a circular motion to such vertically moving glass and also includes apparatus for effecting such circulation comprising an upright circular stack centrally mounted in a blending chamber below the normal level of glass therein and provided with openings at its lower end and suitable impelling means arranged within such stack. To insure adequate homogenization of the incoming glass, the blended glass is discharged from the blender at a point remote from the point of introduction of the continuously melted glass.

In the accompanying drawing illustrating diagrammatically one form of structure embodying the instant invention, Fig. 1 is a plan view, with parts broken away, of such structure.

Fig. 2 is a sectional elevation taken along the line 2—2 of Fig. 1.

Referring to the drawing in detail, 11 represents a molten-glass receiving and blending chamber, which is preferably generally circular in plan and which is provided with a vertically arranged circular stack or cylinder 12 advantageously centrally disposed therein. Circular stack 12 rests on and is joined to the bottom 13 of the blending chamber and is so arranged that its open top terminates appreciably short of the normal glass line 15. Near its bottom the stack is provided with annular rows of perforations 16 for affording circumferential and desirably symmetrical communication between its interior and the interior of the blending chamber 11. A channel 20 forms the means for continuously feeding molten glass to chamber 11 from a parent supply body (not shown). As indicated, chamber 11 is heavily insulated; and a cover 22, desirably having embedded electrical resistance heaters, is provided for chamber 11 and channel 20 to assist in maintaining the body of glass in chamber 11 at a substantially uniform temperature.

A screw-type impeller or pump 25 carried by a shaft 26 projecting down through cover 22 into the interior of stack 12 is adapted for rotation by means of a belt 27 to effect rapid circulation of molten glass within the chamber 11. Advantageously, impeller 25 is so rotated that the body of molten glass is circulated in the general manner indicated by the dotted arrows 28. The clearance or coupling between impeller 25 and circular stack 12 is conveniently such that some slippage of molten glass over the peripheral edge of the impeller screw can take place.

Depending from an outlet 31 in the bottom 13 of chamber 11 is a cylindrical housing 32 having a volume considerably less than that of chamber 11. Mounted within cylindrical housing 32 on a shaft 43 projecting down through cover 22 and chamber 11 is a stirrer 41, which may comprise sets of stirring elements such as those shown in Fig. 3 of the above-mentioned De Voe patent. As indicated, shaft 43 is also rotated by belt 27 but preferably in the opposite direction from shaft 26 in order to minimize surface disturbances. At its other end housing 32 is provided with a depending outlet tube 33 for feeding the blended and stirred glass 44 in accordance with the casting procedure described in the above-mentioned patent to Said and myself.

In operation, the molten glass continuously flowing into chamber 11 through channel 20 is continuously blended with the body of molten glass already contained in chamber 11 by repeated circulation of such body of glass in the manner previously indicated. Such circulation is advantageously effected at a rate considerably greater than that at which the stream of molten glass is introduced into the blending chamber whereby practically immediate blending of such glass with the body of molten glass already in the chamber is accomplished. Since the amount of glass introduced into the blending chamber in a given time is the same as that fed from the stirring housing and since the volume of the body of molten glass in the blending chamber is relatively large in comparison to the volume of the glass mass being cast, only a relatively small volume of freshly melted glass is introduced into the blending chamber during such time in comparison to the volume of glass already in such chamber. Accordingly, only a very slight change in the overall refractive index of such glass body can occur upon blending of such stream therewith whenever there is a longitudinal variation in the refractive index of the latter; and substantial uniformity of refractive index throughout such body of molten glass can thereby be obtained. With the efficient and effective mixing provided by the instant design, not only is such substantial uniformity in refractive index readily obtained but a very appreciable flow of glass through chamber 11 can be accomplished.

Desirably, the incoming stream of molten glass is introduced into the body of molten glass at the top surface thereof so that it initially passes substantially entirely through circular stack 12 and joins the flow of glass being circulated downwardly therethrough. Such stream can, however, also be introduced below the level of the glass body in chamber 11. In any event, outlet 31 is positioned remotely from such point of introduction, the particular location being also governed by the glass circulation pattern employed, so as to prevent short-circuiting of the freshly introduced glass and to insure adequate blending of the same. For most efficient operation, the body of molten glass in chamber 11 is maintained at as uniform a temperature as possible, and the incoming glass stream is introduced thereinto at substantially the same temperature.

While other circulating or pumping means can be employed, the screw-type impeller 25 has been found particularly effective in producing efficient blending. Advantageously, the pumping means is so selected that it imparts a circular motion to the stream of glass flowing downwardly through stack 12 whereby a symmetrical distribution of the incoming stream of glass into and dilution thereof with the body of glass already present in chamber 11 is provided.

As the glass within chamber 11 is being circulated therein, a portion of such blended glass is continuously being fed through outlet 31 into stirring housing 32 wherein the stirring elements of stirrer 41 subject the same to a repeated primarily horizontal shearing action which serves to attenuate and thereby eliminate any cords or striae present in such glass. Although the circulation within chamber 11 serves to effectively reduce the longitudinal variation in the refractive index of the glass introduced into stirring housing 32, no significant shearing action can be simultaneously exerted on the circulating glass because of the large volume of the body of glass contained in chamber 11 and the relatively high speed at which it is desirable to circulate the same. Accordingly, any cords present in the stream of glass fed to chamber 11 are still substantially present in the stream of glass withdrawn therefrom through outlet 31. As will be readily apparent, stirring housing 32 need not be arranged directly below outlet 31 although it is, of course, much more desirable to do so.

Under certain circumstances it may be advantageous to operate the present device on a discontinuous or intermittent basis. In such case the blender chamber 11 is filled with molten glass to the extent desired, and such glass is circulated therein and passed through stirring housing 32 as desired. When chamber 11 is then refilled with molten glass, it may be that the average index of refraction of the latter may be quite different from that of the glass remaining in chamber 11 and stirring housing 32. To insure substantial uniformity of refractive index, the glass in the stirring housing should also be mixed with that in the refilled blending chamber; and an auxiliary pipe 45 can be provided for connecting the lower end of housing 32 with the bottom of chamber 11 to accomplish such mixing. Such circulation is effected by suitable rotation of stirrer 41, the stirring elements of which may desirably be offset with respect to each other to provide increased pumping action. Alternatively or in addition to such arrangement, a downwardly pumping propeller blade or the like can be provided at the lower end of shaft 43. When circulation of glass through tube 45 is not desired, it can be prevented by allowing the glass therein to freeze.

I claim:
1. A molten glass-conditioning apparatus comprising a chamber for receiving molten glass, a vertically arranged cylinder open at both ends within said chamber, said cylinder terminating below the normal level of glass in said chamber, means within said cylinder for circulating therethrough the molten glass within said chamber to effect uniform blending of such molten glass, said chamber being provided with an outlet for the discharge of blended glass therefrom, a vertically arranged cylindrical housing in communication at one end with the outlet of said chamber, said housing having an outlet at its other end, said chamber being relatively large in comparison to said housing, and means within said cylindrical housing for subjecting the blended molten glass passing therethrough to a shearing action to attenuate and eliminate any cords existing in such glass.

2. A molten glass-conditioning apparatus such as defined by claim 1, which includes means for providing a return glass flow path between the outlet end of said cylindrical housing and said receiving chamber.

3. A molten glass-conditioning apparatus such as defined by claim 1, in which the vertically arranged cylinder comprises an upright circular stack mounted on the bottom of the receiving chamber.

4. A molten glass-conditioning apparatus such as claimed in claim 1, in which the outlet of the receiving chamber in position in the bottom thereof and the cylindrical housing is arranged directly below such outlet.

5. A molten glass-conditioning apparatus comprising a molten glass-receiving chamber of substantially circular cross section, means to continuously introduce molten glass thereinto, a centrally disposed, vertically arranged circular stack mounted on the bottom of said chamber and having a plurality of openings near its lower end providing circumferential communication between its interior and the interior of said chamber, said stack terminating below the normal level of glass in said chamber, an impeller arranged within said stack and adapted on rotation for circulating the molten glass within said chamber downwardly through said stack and through said openings to effect uniform blending of such molten glass, said chamber being provided with an outlet in its bottom remote from the molten glass-introducing means for the discharge of blended glass therefrom, a vertically arranged cylindrical housing in direct communication at its upper end with the outlet of said chamber, said housing having an outlet at its lower end, said chamber being relatively large in comparison to said housing, and means within said cylindrical housing for subjecting the blended molten glass passing therethrough to a shearing action to attenuate and eliminate any cords existing in such glass.

6. A molten glass-conditioning apparatus comprising a molten glass-receiving chamber of substantially circular cross section, means to continuously introduce molten glass thereinto, a centrally disposed, vertically arranged circular stack mounted on the bottom of said chamber and having a plurality of openings near its lower end providing circumferential communication between its interior and the interior of said chamber, said stack terminating below the normal level of glass in said chamber, and an impeller arranged within said stack and adapted on rotation for circulating the molten glass within said chamber downwardly through said stack and through said openings to effect uniform blending of such molten glass, said chamber being provided with an outlet in its bottom remote from the molten glass-introducing means for the discharge of blended glass therefrom.

References Cited in the file of this patent
UNITED STATES PATENTS

| | | |
|---|---|---|
| 2,020,143 | Haub | Nov. 5, 1935 |
| 2,515,478 | Tooley et al. | July 18, 1950 |
| 2,569,459 | De Voe | Oct. 2, 1951 |
| 2,641,454 | Labino | June 9, 1953 |

FOREIGN PATENTS

| | | |
|---|---|---|
| 711,976 | France | July 8, 1931 |